(12) United States Patent
Yang (10) Patent No.: US 12,339,577 B2
(45) Date of Patent: Jun. 24, 2025

(54) CAMERA EQUIPMENT AND TERMINAL

(71) Applicants: ESSENCE TECHNOLOGY HOLDINGS (HK) LIMITED, Hong Kong (CN); NEXIGHT INC, Beaverton, OR (US)

(72) Inventor: Dongwei Yang, Hong Kong (CN)

(73) Assignees: ESSENCE TECHNOLOGY HOLDINGS (HK) LIMITED, Hong Kong (CN); NEXIGHT INC, Beaverton, OR (US)

(\*) Notice: Subject to any disclaimer, the term of this patent is extended or adjusted under 35 U.S.C. 154(b) by 54 days.

(21) Appl. No.: 18/055,425

(22) Filed: Nov. 15, 2022

(65) Prior Publication Data
US 2024/0019761 A1    Jan. 18, 2024

(30) Foreign Application Priority Data
Jul. 13, 2022 (CN) .......................... 202221816676.4

(51) Int. Cl.
*G03B 7/083* (2021.01)
*H04N 23/73* (2023.01)

(52) U.S. Cl.
CPC .............. *G03B 7/083* (2013.01); *H04N 23/73* (2023.01)

(58) Field of Classification Search
CPC ....... G03B 7/083; G03B 11/043; H04N 23/73
See application file for complete search history.

(56) References Cited

U.S. PATENT DOCUMENTS

| | | | |
|---|---|---|---|
| 2006/0039695 A1* | 2/2006 | Naganuma | G03B 9/14 396/485 |
| 2007/0297792 A1* | 12/2007 | Hayakawa | G03B 9/06 396/508 |
| 2012/0075521 A1* | 3/2012 | Tsai | G03B 17/10 348/E5.04 |
| 2015/0163385 A1* | 6/2015 | Haddad | G03B 17/565 348/374 |
| 2018/0017843 A1* | 1/2018 | Tsai | G06F 1/1607 |
| 2018/0059510 A1* | 3/2018 | Gustaveson, II | G03B 11/043 |
| 2019/0258137 A1* | 8/2019 | VanTassell | G03B 9/38 |
| 2020/0249415 A1* | 8/2020 | Wang | G03B 9/36 |
| 2021/0033948 A1* | 2/2021 | Ushio | G03B 11/043 |
| 2021/0127045 A1* | 4/2021 | Clark | G06F 3/017 |
| 2023/0024718 A1* | 1/2023 | Huang | H04N 23/54 |

\* cited by examiner

*Primary Examiner* — Amy R Hsu (57) ABSTRACT

The present disclosure describes a piece of camera equipment and a terminal. The camera equipment includes a housing, a camera assembly, a shutter component, and a sensing mechanism. The housing defines an accommodation space; the camera assembly and the shutter component are arranged in the accommodation space. The shutter component defines a through-hole, and the through-hole is configured to enable the camera assembly to acquire image information through the through-hole. The sensing mechanism is connected with the shutter component and configured to control the shutter component to reveal or block the through-hole in response to the user's control command.

11 Claims, 12 Drawing Sheets

CAMERA EQUIPMENT AND TERMINAL

CROSS-REFERENCE TO RELATED APPLICATIONS

The present disclosure claims priority of Chinese Patent Application No. 202221816676.4 and application name of "CAMERA EQUIPMENT", filed on Jul. 13, 2022, the contents of which are hereby incorporated by reference.

TECHNICAL FIELD

The present disclosure relates to the field of camera technology, and in particular, to a piece of camera equipment and a terminal.

BACKGROUND

Cameras are widely used in electronic products, expanding their possible use cases. However, these cameras often depend on software to function, which makes it possible for unscrupulous actors to infiltrate a network and take control of the camera component, granting them access to acquire image-based information without the camera user's knowledge, thereby breaching the user's privacy.

SUMMARY

This present disclosure introduces a piece of camera equipment and a terminal. The camera equipment and the terminal can expose or block the camera's sight line according to the user's needs to protect their privacy.

To solve the above technical problems, the first technical solution adopted by the present disclosure is to provide the piece of camera equipment. The piece of camera equipment includes a housing, camera assembly, shutter component, and sensing mechanism, wherein the housing defines an accommodation space, the camera assembly and shutter component are arranged in the accommodation space, and the shutter component defines a through-hole. The through-hole is configured to enable the camera assembly to acquire image information via the through-hole, and the sensing mechanism is connected to the shutter component to control the shutter component to reveal or block the through-hole in response to the user's control command.

To solve the above technical problems, a second technical solution adopted by the present disclosure is to provide the piece of camera equipment. The piece of camera equipment includes a camera assembly and a shutter component. The shutter component is connected with the camera assembly and defines a through-hole. The through-hole is configured to enable the camera assembly to acquire image information via the through-hole and to automatically reveal or block the through-hole in response to the user's control command.

To solve the above technical problems, a third technical solution adopted by the present disclosure is to provide a terminal. The terminal includes a shell, a camera assembly, a shutter component, and a sensing mechanism. The shell defines a space. The camera assembly and the shutter component are arranged in the space. The shutter component defines a through-hole. The through-hole is configured to enable the camera assembly to acquire image information via the through-hole. The sensing mechanism is connected to the shutter component and configured to control the shutter component to reveal or block the through-hole in response to the user's control command.

BRIEF DESCRIPTION OF THE DRAWINGS

To make the technical solution described in the present disclosure clearer, in addition, to help clarify prior drawings, the drawings used for the description of the embodiments will be briefly described. The drawings described below are only for illustration purposes, not to in any way define limitations. One skilled in the art may acquire other drawings based on these drawings, without making any inventive work.

DETAILED DESCRIPTION OF THE PREFERRED EMBODIMENTS

The present disclosure will be described more fully below with reference to the relevant drawings. The drawings show some embodiments of the present disclosure. The described embodiments are only a part of the embodiments of the present disclosure, not all of the embodiments. All other embodiments acquired by those skilled in the art based on the embodiments of the present disclosure without creative efforts shall fall within the protection scope of the present disclosure.

In the description of the present disclosure, it should be understood that the orientations or locational relations that are indicated by terms such as "center", "middle", "in", "out", "upper", "lower", "front", "rear", "left", "right", "vertical", "horizontal", "top", "bottom", "inner", "outer", "clockwise" and "counterclockwise" and the like are based on the orientations and locational relations illustrated in the drawings, which are only for the convenience of describing the present disclosure and simplifying the description, and do not indicate or imply that the device or component referred to must have a specific orientation or be configured and operate in a specific orientation, so these terms cannot be understood as limiting the present disclosure. In addition, the terms "first" and "second" are used for descriptive purposes only and are not intended to indicate or imply relative importance, or implicitly indicate the number of technical features indicated. Thus, features defined as "first" or "second" may include one or more of the described features either explicitly or implicitly. In the description of the present disclosure, the terms "multiple," "a plurality of," and the like should be understood to mean "two or more", unless otherwise expressly and specifically defined.

When the user accesses a computing device, the camera can be activated at any time as part of the computing device. Some applications, such as chat applications or video conferencing applications, will invoke the camera by providing power to the camera. There is a case where after the camera is started, the user of the computing device may want to turn off or physically block the camera immediately to protect personal privacy in recorded videos. Manually stopping the camera recording or turning off the video control may be time-consuming and troublesome, but physical components may be damaged by physically moving the device by hand. Additionally, it is inconvenient for the user to reveal the software to restart the video after closing it to stop recording, but this is often the only recourse.

Therefore, the present disclosure provides a scheme to physically block or expose the camera using a touch switch, and the camera can be an independent accessory, peripheral component, or can be integrated into the camera assembly of a terminal (e.g., notebook computer, tablet computer, smartphone, personal computer, etc.). For example, the camera can be set as an additional after-sales component along the top side of the terminal or as an integrated internal configuration of the terminal. However, for video conferencing, a built-in camera may have lower performance parameters, and poor video pixelation, and the position of the built-in camera cannot be flexibly adjusted. Some embodiments of the present disclosure, for instance, use an external camera.

In some embodiments, the present disclosure describes a piece of camera equipment. The camera equipment includes a housing, a camera assembly, a shutter component, and a sensing mechanism. The housing defines an accommodation space. The camera assembly is arranged in the accommodation space. The shutter component is also arranged in the accommodation space and defines a through-hole. The through-hole is configured to enable the camera assembly to acquire image information via the through-hole. The sensing mechanism is connected to the shutter component and configured to command the shutter component to reveal or block the through-hole in response to the user's control command.

In an embodiment, the shutter component includes a supporting part and a shielding part. The supporting part defines the through-hole. The shielding part is connected with the support part and the sensing mechanism and is configured to reveal or block the through-hole under the control of the sensing mechanism. The sensing mechanism includes a driver configured to drive the shielding part to slide or rotate to reveal or block the through-hole.

In an embodiment, the shielding part includes a plurality of shields, and the plurality of shields block the through-hole by splicing or overlapping.

In an embodiment, the shielding part includes a first shield and a second shield, and the driver is configured to drive the first shield to slide to the first position along a direction close to the second shield and drive the second shield to slide to a second position along a direction close to the first shield so that the first shield and the second shield block the through-hole. The driver is also configured to drive the first shield to slide to a third position along the direction away from the second shield and drive the second shield to slide to a fourth position along the direction away from the first shield so that the first shield and the second shield reveal the through-hole.

In an embodiment, the first shield and the second shield are configured to block the through-hole by overlapping when the first shield is in the first position and the second shield is in the second position. The first shield and the second shield are also configured to reveal the through-hole by overlapping when the first shield is in the third position and the second shield is in the fourth position.

In an embodiment, the first shield includes a first shield body and is provided with a penetrated hole. The aperture size of the penetrated hole is greater than or equal to the aperture size of the through-hole. The second shield includes a second shield body and is provided with a notch. The shape of the notch is part of the shape of the through-hole. The first shield and the second shield are configured such that when the first shield slides to the first position and the second shield slides to the second position, the notch and the penetrated hole are overlapped and coaxially arranged with the through-hole.

In an embodiment, the first shield has a first sliding channel, the second shield has a second sliding channel, and the first sliding channel and the second sliding channel are configured to define a track on which the first shield and the second shield slide.

In an embodiment, the sensing mechanism includes a sensing switch, a sensing chip, and a controller. The sensing switch is configured to sense a control command. The sensing chip is electrically connected with the sensing switch and the driver and is configured to output a current to the driver. The controller is electrically connected with the sensing chip and configured to control the sensing chip to output current to the driver.

In an embodiment, the sensing switch is a sensing spring configured to identify touch commands from the user.

In an embodiment, the driver includes a magnetic cylinder assembly and a driving member connected with the magnetic cylinder assembly. The magnetic cylinder assembly is configured to provide the driving force for the driving member. The driving member includes one end, a first shift rod, and a second shift rod arranged opposite to the end. The end is connected with the magnetic cylinder assembly, the first shift rod is connected with the first shield, and the second shift rod is connected with the second shield. The driving member is configured to drive the first shield and the second shield to slide by using the driving force provided by the magnetic cylinder assembly.

In an embodiment, the housing includes a mounting plate that defines a via-hole and is configured to enable the camera assembly to acquire external image data. The camera assembly includes a camera and a camera holder configured to install the camera. The shutter component is arranged between the camera and the mounting plate. The via-hole, the through-hole and the camera are coaxially arranged. The aperture of the through-hole and the aperture of the through-hole are both greater than or equal to the aperture of the camera lens.

In some embodiments, the present disclosure describes a piece of camera equipment. The camera equipment includes a camera assembly and a shutter component. The shutter component is connected with the camera assembly and defines a through-hole. The through-hole is configured to enable the camera assembly to acquire image information via the through-hole, and also to automatically reveal or block the through-hole in response to the user's control command.

In an embodiment, the camera equipment includes a sensing mechanism connected with the shutter component. The shutter component includes a supporting part and a shielding part. The supporting part defines the through-hole. The shielding part is connected with the support part and the sensing mechanism and is configured to automatically reveal or block the through-hole according to the sensing mechanism.

In an embodiment, the shielding part includes a plurality of shields, and the plurality of shields block the through-hole by splicing or overlapping.

In an embodiment, the shielding part includes a first shield and a second shield. The first shield is configured to be driven by the sensing mechanism to slide to the first position in a direction close to the second shield. The second shield is configured to be driven by the sensing mechanism to slide to a second position along a direction close to the first shield so that the first shield and the second shield block the through-hole. The first shield is also configured to be driven by the sensing mechanism to slide to a third position along the direction away from the second shield. The second shield is configured to be driven by the sensing mechanism to slide to a fourth position along the direction away from the first shield so that the first shield and the second shield define the through-hole.

In an embodiment, the first shield and the second shield are configured to block the through-hole by overlapping when the first shield is in the first position and the second shield is in the second position. The first shield and the second shield are also configured to reveal the through-hole by overlapping when the first shield is in the third position and the second shield is in the fourth position.

In an embodiment, the first shielding part includes a first shield body and is provided with a penetrated hole. The aperture size of the penetrated hole is greater than or equal to the aperture size of the through-hole. The second shield includes a second shield body and is provided with a notch. The shape of the notch is part of the shape of the through-hole. The first shield and the second shield are configured such that when the first shield slides to the first position and the second shield slides to the second position, the notch and the through-hole are overlapped and set coaxially with the through-hole.

In an embodiment, the first shield has a first sliding channel, the second shield has a second sliding channel, and the first sliding channel and the second sliding channel are configured to define a track on which the first shield and the second shield slide.

In an embodiment, the camera equipment includes a housing. The housing defines an accommodation space. The housing includes a mounting plate that defines a via-hole and is configured to enable the camera assembly to acquire external image data. The camera assembly includes a camera and a camera holder configured to install the camera. The shutter component is arranged between the camera, and the mounting plate. The via-hole, the through-hole and the camera are coaxial. The aperture of the through-hole and the aperture of the through-hole are both greater than or equal to the aperture of the camera lens.

In some embodiments, the present disclosure provides a terminal. The terminal includes a shell, a camera assembly, and a shutter component. The shell defines a space. The camera assembly is arranged in the space. The shutter component is arranged in the space and defines a through-hole. The through-hole is configured to enable the camera assembly to acquire image information via the through-hole. The sensing mechanism is connected to the shutter component and configured to command the shutter component to reveal or block the through-hole in response to the user's control command.

Figure 1:
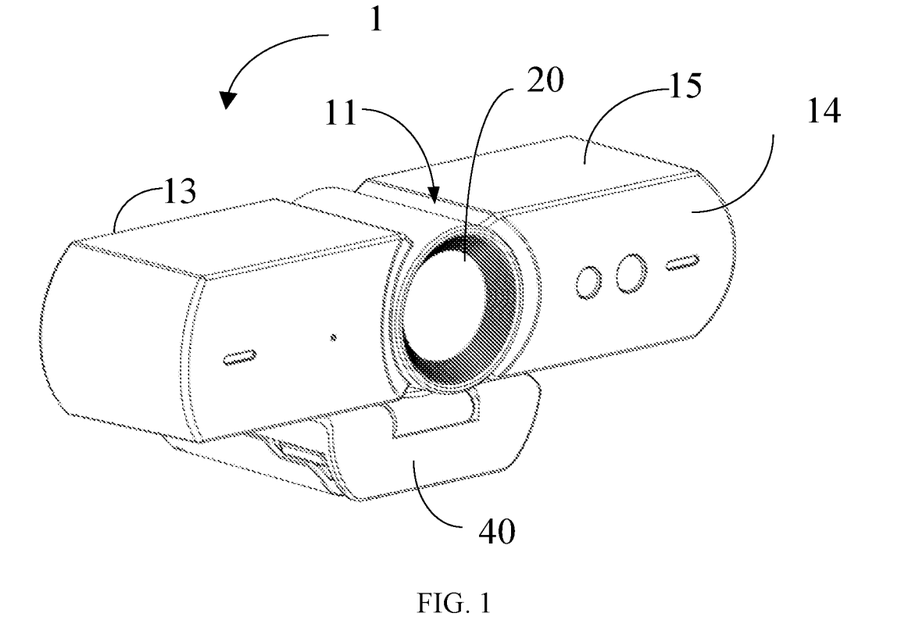
FIG. 1 is an isometric structural schematic view of the camera equipment provided by certain embodiments of the present disclosure.
Figure 2:
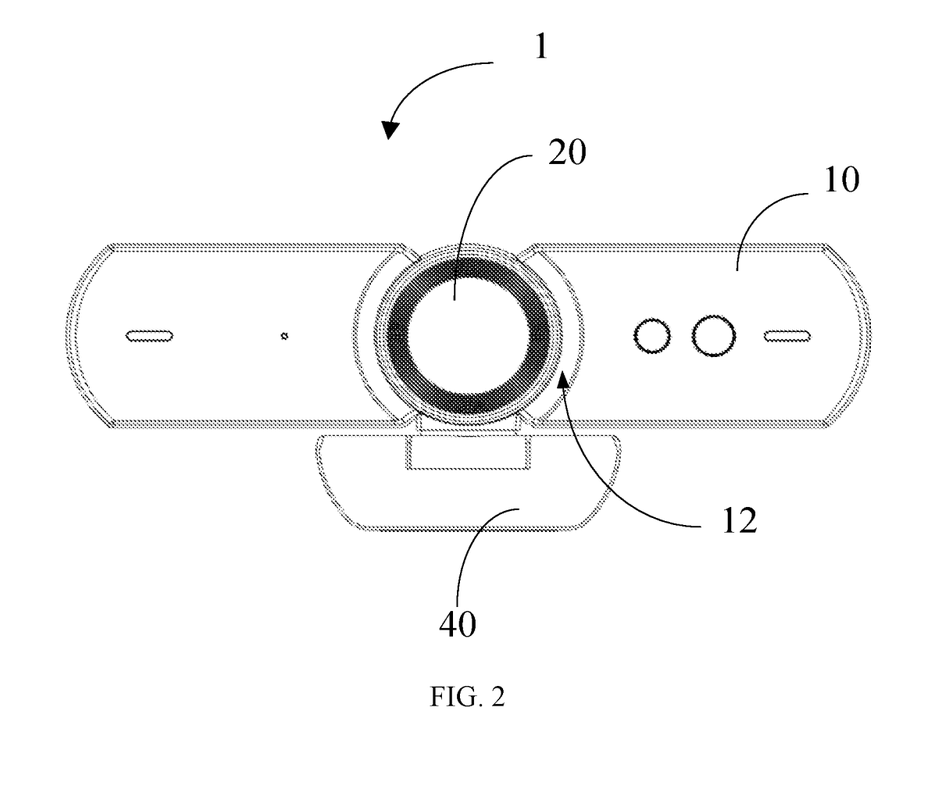
FIG. 2 is a front view of the camera equipment shown in FIG. 1.
Figure 3:
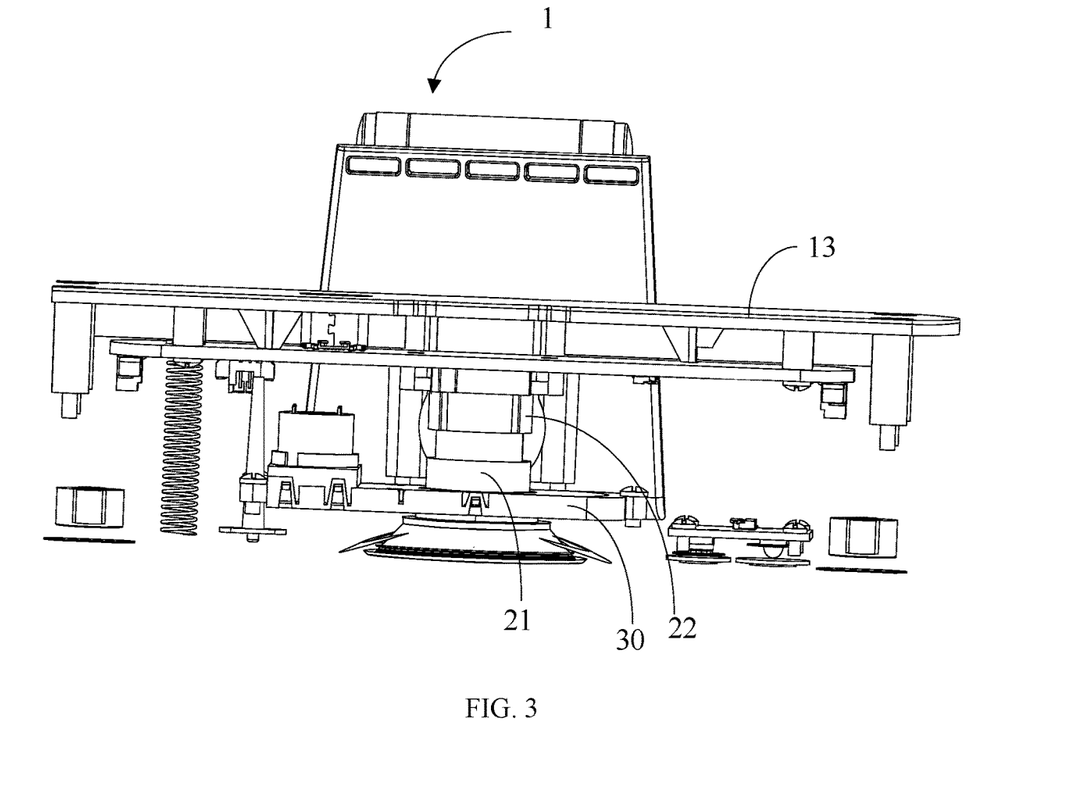
FIG. 3 is a top view of the camera equipment shown in FIG. 1 without a wall plate or side plates shown.
Figure 4:
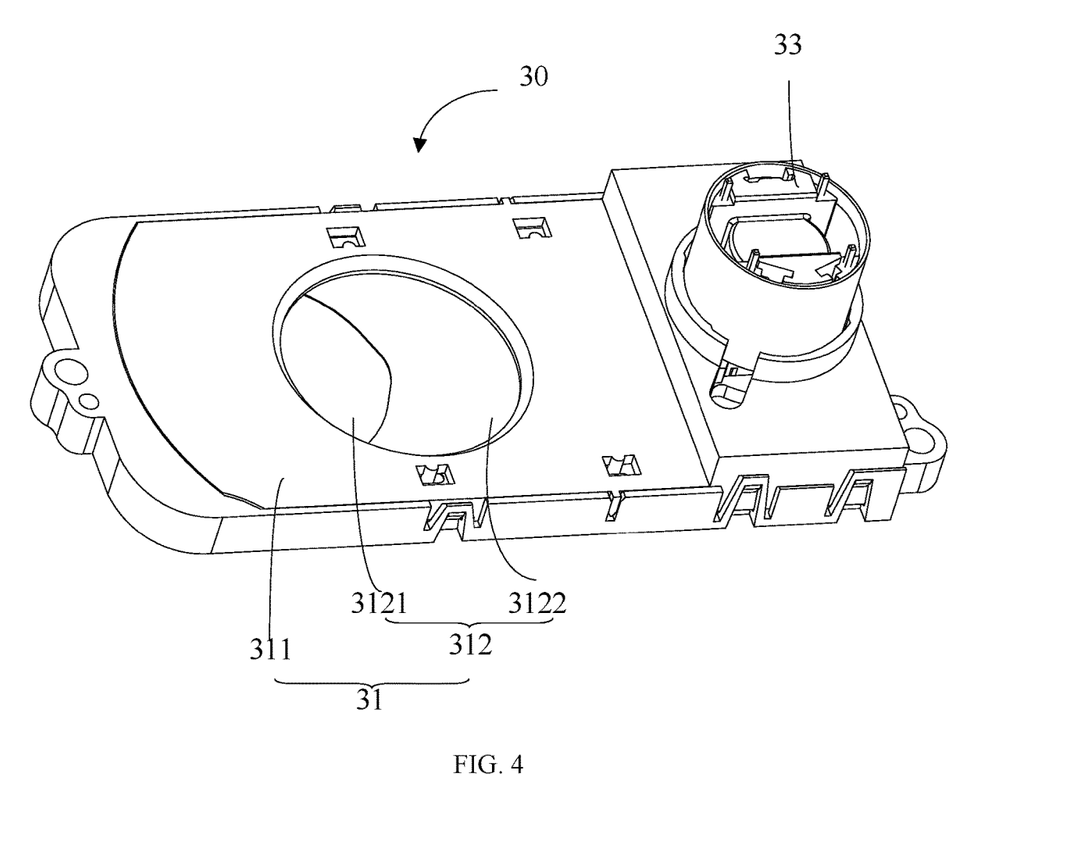
FIG. 4 is a structural view of the shutter component when the through-hole is in a reveal state provided by certain embodiments of the present disclosure.

As shown in FIGS. 1 to 3, the present disclosure provides the camera equipment 1 for a terminal. The camera equipment 1 communicates with the terminal through a USB interface, Wi-Fi, or Bluetooth connection. In some embodiments of the present disclosure, the camera equipment 1 and the terminal communicate with each other through the USB interface. The camera equipment 1 includes a housing 10, a camera assembly 20, and a privacy cover assembly 30. The housing 10 defines an accommodation space 11, and the camera assembly 20 and the privacy cover assembly are arranged in the accommodation space 11. The privacy cover assembly 30 is configured to physically block or expose the camera assembly 20.

The material of the housing 10 can be glass or plastic, and the housing is configured to accommodate and protect the camera assembly 20 and the privacy cover assembly 30. In the embodiment, the housing 10 is made of plastic. The housing 10 is provided with a via-hole 12 which connects the accommodation space 11 with the outside world so that the camera assembly can acquire image data. As shown in FIGS. 1 and 3, the housing 10 includes a mounting plate 13, a wall plate 14 opposite the mounting plate 13, and a plurality of side plates 15 surrounding the mounting plate 13 and the wall plate 14. The mounting plate 13, the wall plate 14, and the plurality of side plates 15 can be connected by bonding, welding, screwing, and the like, or by integrated molding. The mounting plate 13, the wall plate 14, and the plurality of side plates 15 define the accommodation space 11, and the via-hole 12 is revealed on the wall plate 14.

As shown in FIG. 3, the camera assembly 20 is configured to capture image data that is transmitted to a corresponding terminal. The camera assembly 20 includes a camera 21 and a camera holder 22 configured to install the camera 21. The camera 21 can acquire external image data via the via-hole 12. The aperture size of the camera lens is less than or equal to the aperture size of the via-hole 12. The camera 21 and via-hole 12 are coaxially arranged.

As shown in FIG. 3, the privacy cover assembly 30 is arranged between wall plate 14 and the camera 21 and is configured to protect the privacy of the user. In some embodiments, as shown in FIGS. 4 to 8, the privacy cover assembly 30 includes a shutter component 31 and a sensing mechanism 33. The shutter component 31 includes a supporting part 311 and a shielding part 312. The supporting part 311 defines a through-hole 3110 configured to enable the camera assembly 20 to acquire the external image data. The through-hole 3110, the via-hole 12, and the camera 21 are coaxially arranged. The aperture size of the through-hole 3110 is greater than or equal to the aperture size of the lens of the camera so that the lens of the camera is completely exposed. The shielding part 312 is connected with the support part 311, can move relative to the support part 311, is configured to expose the camera by revealing the through-hole 3110 when the camera 21 needs to be used, and blocks the camera by blocking the through-hole 3110 when the camera 21 is not needed, thus preventing the exposure of user privacy and improving security. The sensing mechanism 33 is connected to the shielding part 312 and is configured to control the movement of the shielding part 312 in response to a user control command.

Figure 7:
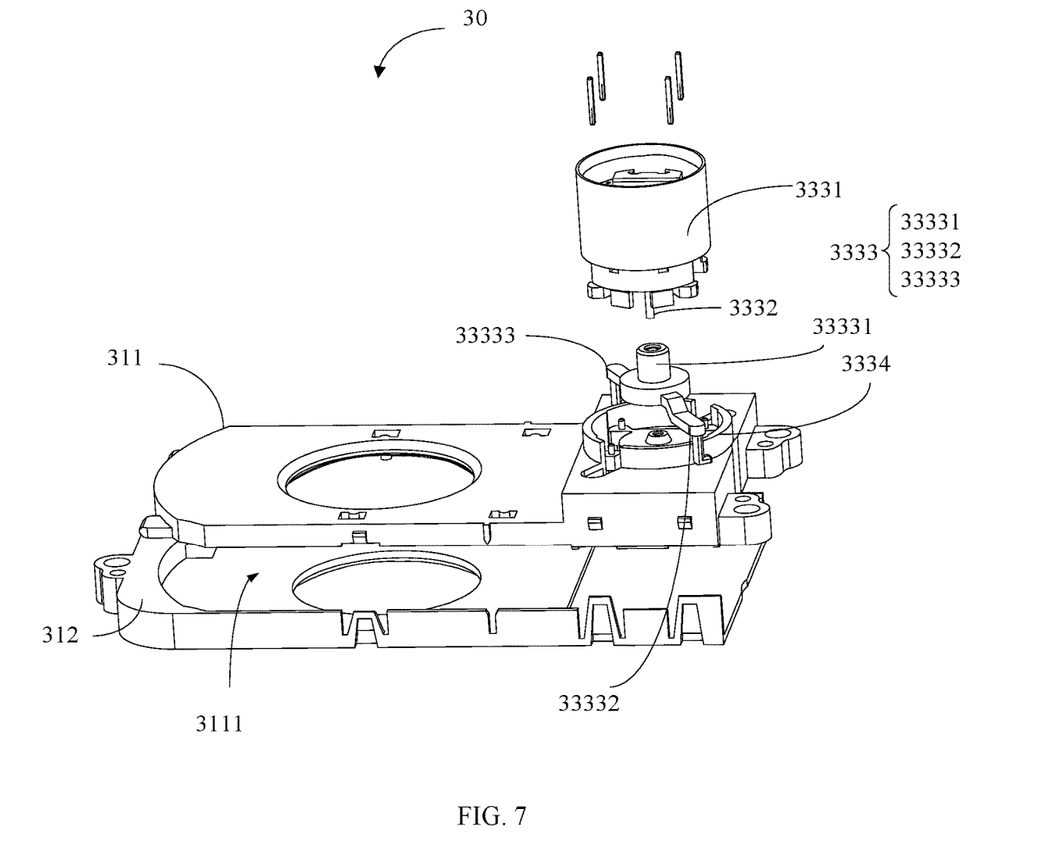
FIG. 7 is an exploded structural schematic view of the privacy cover assembly in FIG. 6.

In some embodiments, as shown in FIG. 7, the support part 311 is provided with a mounting space 3111 configured to accommodate the shielding part 312. Specifically, the support part 311 may also include a first support 3112 and a second support 3113. The first support 3112 and the second support 3113 may be connected by clamping, bolting, bonding, and the like, and there is no specific limitation therein in the present disclosure. The first support 3112 is provided with a positioning column. The positioning column cooperates with the shielding part 312 and restricts the shielding part 312 from sliding. The number of the positioning columns is unlimited and can be selected according to needs, such as 1, 2, 3, 4, 5, and so on. In some embodiments of the present disclosure, the number of the positioning columns is 4, which are positioning columns 31120a, 31120b, 31120c, and 31120d, respectively.

The shielding part 312 includes at least one shield and may have as many as one, two, or three shields. When the shielding part 312 includes only one shield, the through-hole 3110 can be revealed or blocked by the single shield moving relative to the support part 311. When the shielding part 312 includes at least two shields, then at least two shields can block the through-hole 3110 by splicing or overlapping, and reveal the through-hole 3110 by moving in a direction away from each other. Since at least two shields may not be sealed tightly in a splicing method, and at least two shields can completely block the through-hole 3110 after overlapping, the overlapping method is safer. It should be noted that the "moving" here can be sliding or rotation and the following will take the moving mode of sliding, as an example.

Figure 9:
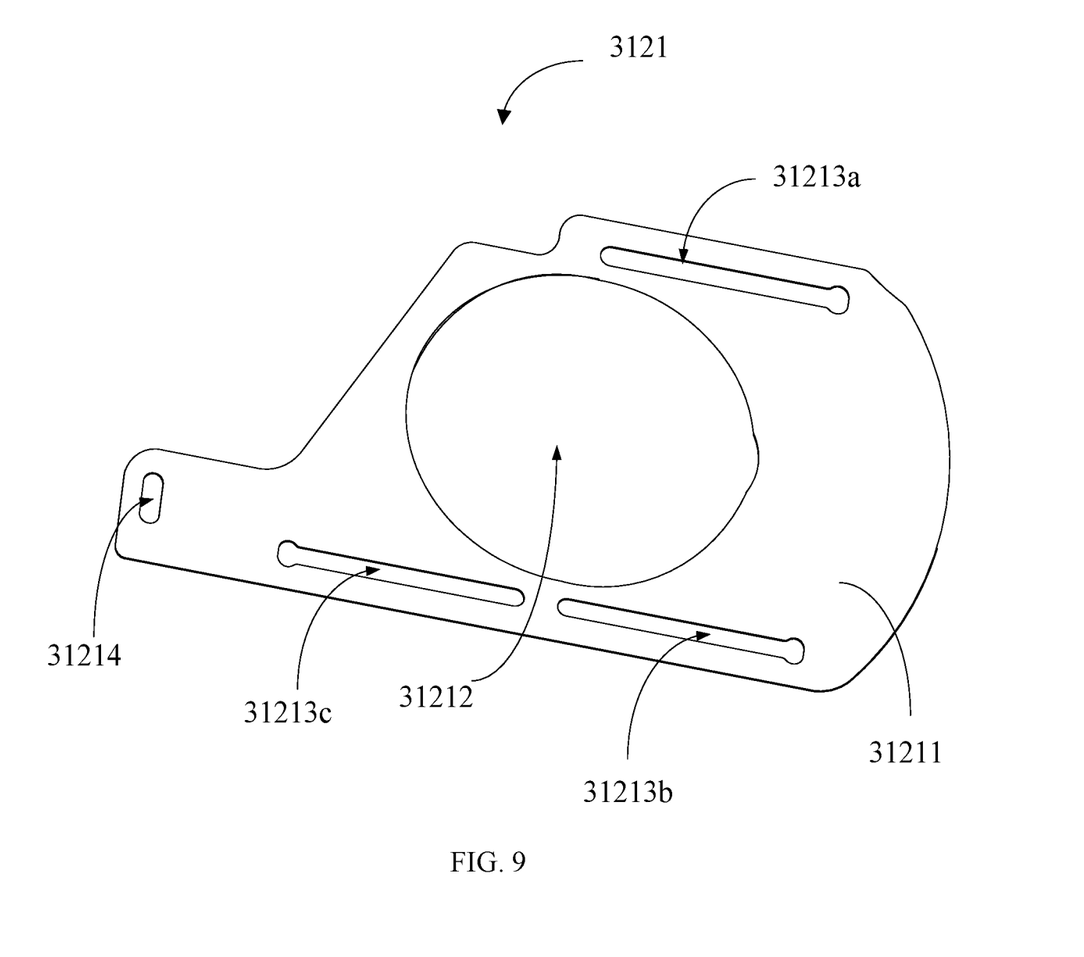
FIG. 9 is a structural schematic view of the second shield provided by some embodiments of the present disclosure.
Figure 10:
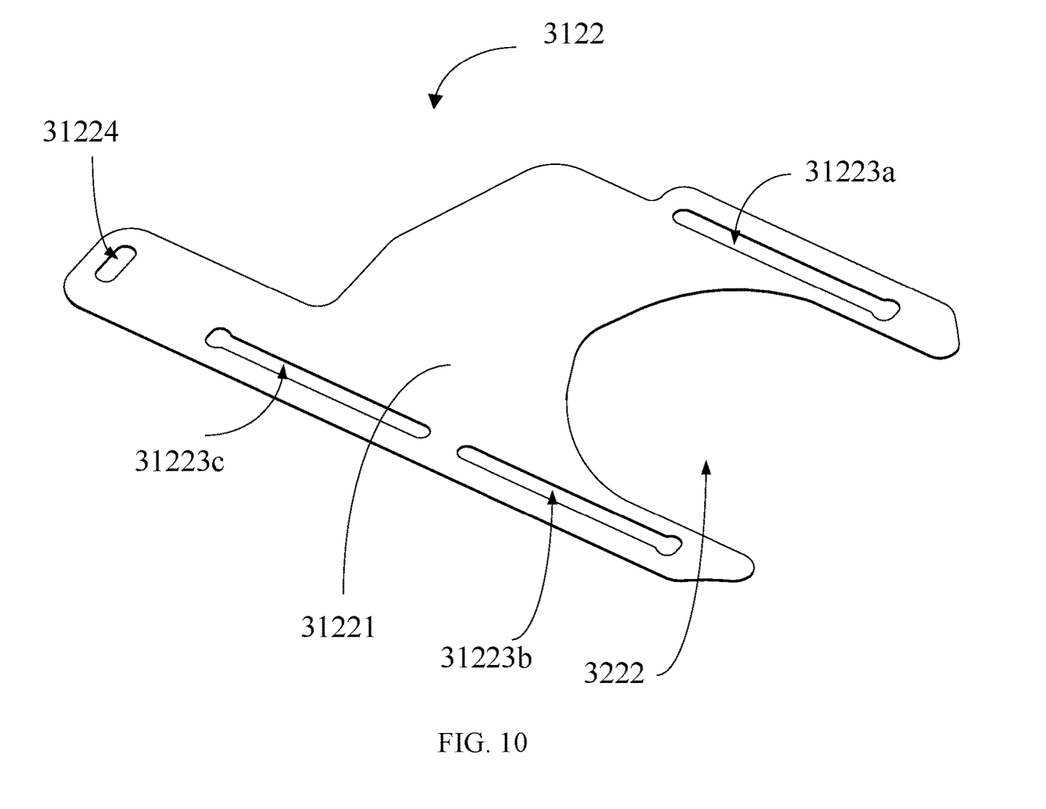
FIG. 10 is the structural schematic view of the sensing mechanism provided by the embodiments of the present disclosure.

In some embodiments of the present disclosure, the shielding part 312 includes a first shield 3121 and a second shield 3122, and the first shield 3121 and the second shield 3122 are stacked. The first shield 3121 and the second shield 3122 can slide in a direction away from each other, and then reveal the through-hole 3110 by the first shield 3121 sliding to a first position and the second shield 3122 sliding to a second position, and can also slide in a direction close to each other, and then block the through-hole 3110 together by the first shield 3121 sliding to a third position and the second shield 3122 sliding to a fourth position. As shown in FIGS. 9 and 10, the first shield 3121 includes a first shield body 31211 and reveals a penetrated hole 31212. The aperture size of the penetrated hole 31212 is greater than or equal to the aperture size of the through-hole 3110. The second shield 3122 includes a second shield body 31221 and reveals a notch 31222. The shape of notch 31222 matches the shape of the through-hole 3110; that is, the shape of notch 31222 is part of the shape of the through-hole 3110. When the second shield 3122 slides to the second position, the second shield body 31221 will not block the through-hole 3110. For example, the shape of notch 31222 is an arc, and the center of the arc coincides with the center of the through-hole 3110. That is, the notch 31222 and the through-hole 3110 are coaxial, and the aperture size of the arc is greater than or equal to the aperture size of the through-hole 3110. When the first shield 3121 slides to the first position and the second shield 3122 slides to the second position, the through-hole 3110, the penetrated hole 31212, and the notch 31222 coincide, thereby exposing the camera 21. When the first shield 3121 slides to the third position and the second shield 3122 slides to the fourth position, the first shield body 31211 and the second shield body 31221 are superimposed, and the first shield body 31211 and the second shield body 31221 blocks the through-hole 3110. It can be understood that although the more shields there are, the better the blocking of the camera 21 can be ensured after the shields overlap, but more shields will lead to a thicker overlap, which is not conducive to the miniaturization of the camera equipment and increases the production cost. Therefore, the number of shields is limited to three. In addition, compared to the case with only one shield, the first shield 3121 and the second shield 3122 only need to respectively move half of the diameter of the through-hole 3110 to block the through-hole 3110. When there is only one shield, the number of rockers and corners of the driver 333 will also be increased. Therefore, two shields is the spatially optimal number.

Figure 11:
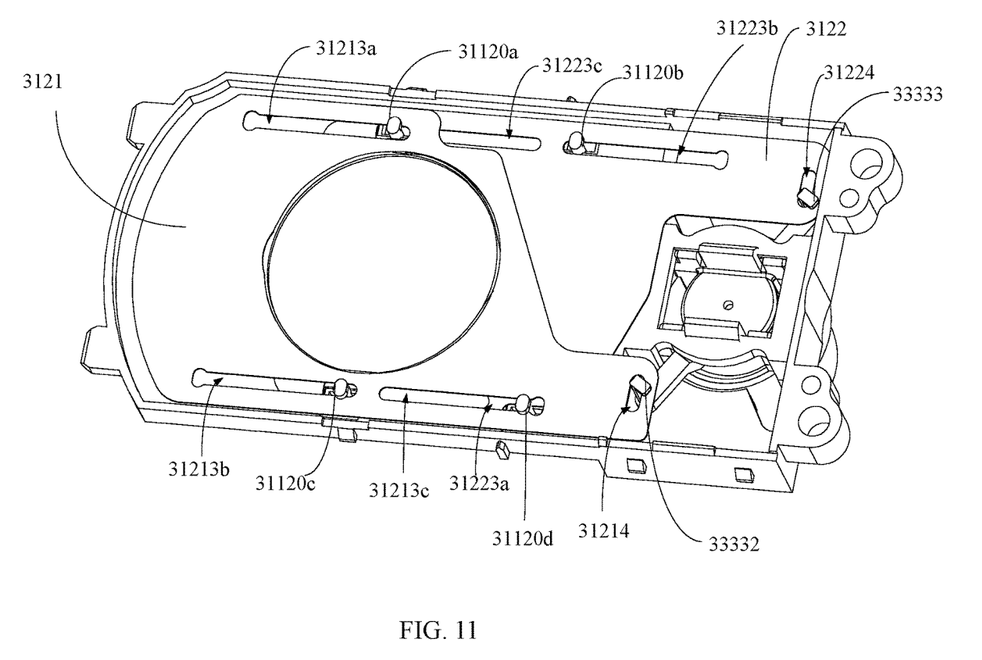
FIG. 11 is a schematic view of the first support, the first shield, and the second shield in an assembly state provided by the embodiments of the present disclosure.

As shown in FIGS. 9 to 11, the first shield 3121 has a first sliding channel, and the second shield 3122 also has a second sliding channel; the first sliding channel and the second sliding channel can prevent the first shield 3121 and the second shield 3122 from deflecting when the first shield 3121 and the second shield 3122 slide. The number of the first sliding channel and the second sliding channel can be set as needed. In some embodiments of the present disclosure, the number of the first sliding channel and the number of the second sliding channel are both 3; namely, the first sliding channel 31213a, the first sliding channel 31213b, and the first sliding channel 31213c, the second sliding channel 31223a, the second sliding channel 31223b, and the second sliding channel 31223c, respectively. The first sliding channel 31213a is arranged on one side of the first shield 3121, and the first sliding channel 31213b and the first sliding channel 31213c are arranged on the other side of the first shield 3121 and arranged opposite to the first sliding channel, 31213a. The second sliding channel 31223a is arranged on one side of the second shield 31221, and the second sliding channel 31223b and the second sliding channel 31223c are arranged on the other side of the second shield 3122 and arranged opposite to the second sliding channel, 31223a. The positioning column 31120a passes through the first sliding channel 31213a and the second sliding channel 31223c, the positioning column 31120b passes through the second sliding channel 31223b, the positioning column 31120c passes through the first sliding channel 31213b, and the second sliding channel 31223c, and the positioning column 31120d passes through the first sliding channel 31213c and the second sliding channel 31223a. Due to the action of the positioning columns 31120a, 31120b, 31120c, and 31120d, the first shield 3121 and the second shield 3122 can only slide along an extension direction of the first sliding channels and the second sliding channels.

The sensing mechanism 33 can be configured to respond to the user's control command. The control mode can be touch control or hovering control. In some embodiments of the present disclosure, the control mode is touch control. As shown together in FIG. 8, the sensing mechanism 33 includes a sensing switch 330, a sensing chip 331, a controller 332, and a driver 333. The sensing switch 330 is configured to sense the user's actions (such as pressing or touching) and generate a control command. The sensing chip 331 is configured to output current to the driver 333, and the controller 332 is electrically connected to the sensing chip 331 and configured to control the sensing chip 331 to output current to the driver 333 according to the sensing control command. The driver 333 is connected to the shielding part 312, and the driver 333 generates a driving force under the action of the current and drives the shielding part 312 to slide.

Figure 8:
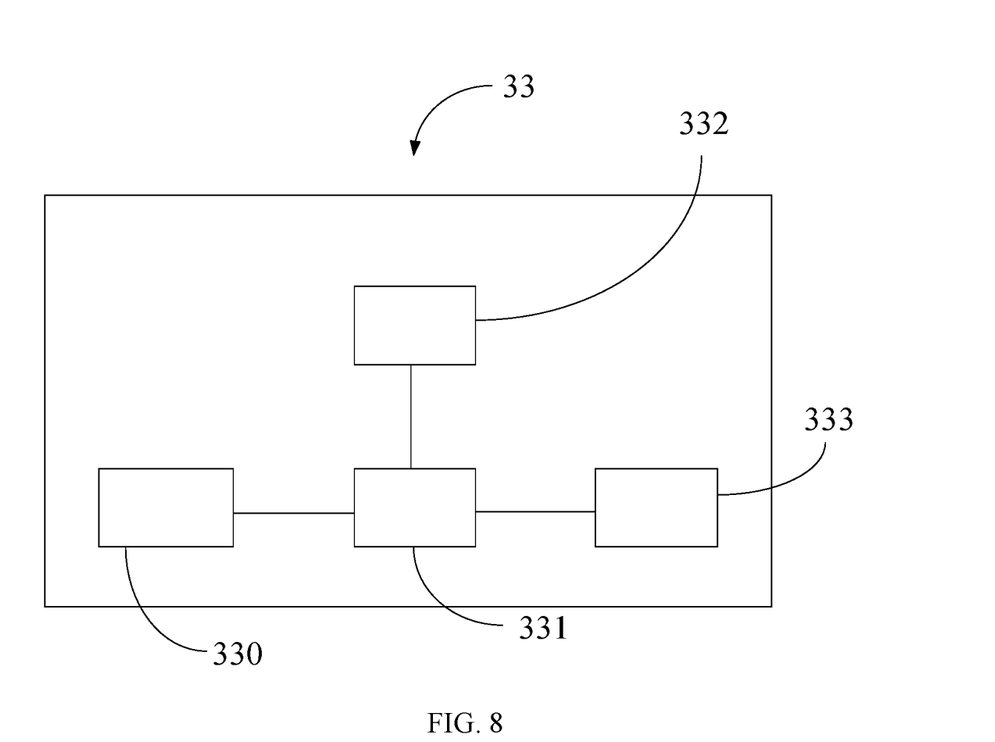
FIG. 8 is a structural schematic view of the first shield provided by some embodiments of the present disclosure.

The sensing switch 330 is configured to sense a control command of the user. In some embodiments of the present disclosure, the sensing switch 330 can be a sensing spring configured to sense a touch action of the user. For example, the sensing spring can recognize the user touching a capacitive button, and the command generated by the user will be coupled to static capacitance, causing the capacitance to change.

The sensing chip 331 is electrically connected with the controller 332 and the driver 333 respectively and is configured to receive a control command of the controller 332. For example, the controller will generate a control signal when sensing the change of capacitance to control whether the sensing chip 331 outputs current and then controls whether the driver 333 moves.

Figure 5:
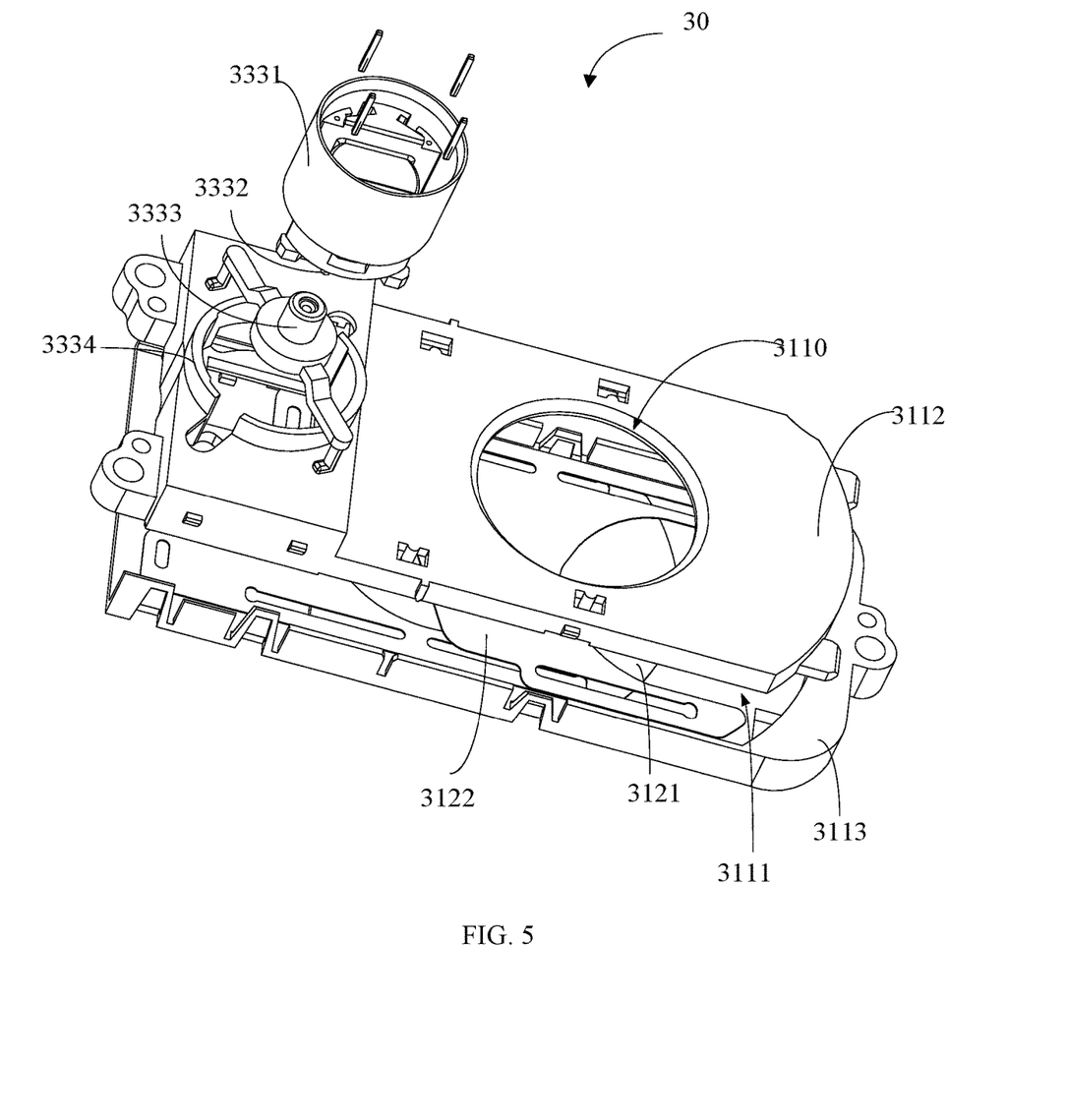
FIG. 5 is an exploded structural schematic view of the privacy cover assembly in FIG. 4.
Figure 6:
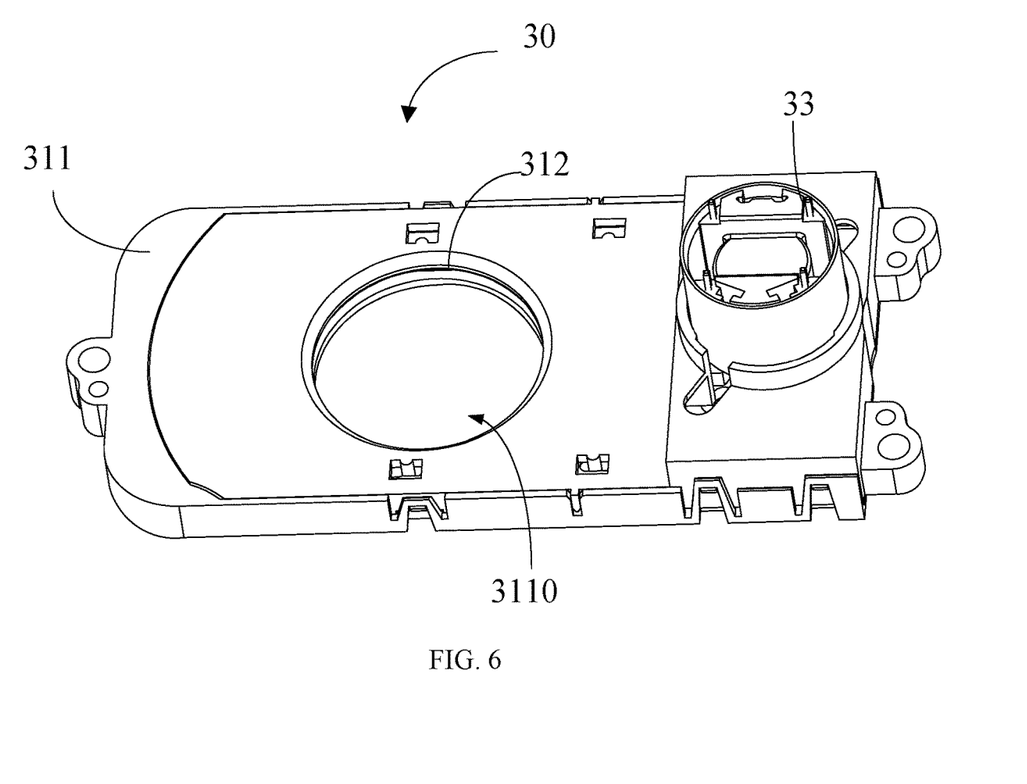
FIG. 6 is a structural view of the shutter component when the through-hole is in a closed state provided by some embodiments of the present disclosure.

The driver 333 provides power for the shielding part 312. The power can be provided by the motor, electromagnetic force, electrostatic, thermo-electric, or piezo-electric effects. Because the physical principles differ in their advantages and disadvantages, a suitable driving principle should be chosen according to the application. In some embodiments of the present disclosure, the shielding part 312 is driven to slide by the motor. As shown in FIGS. 5 and 7, the driver 333 includes a magnetic guide member 3331, a magnetic cylinder assembly 3332, a driving member 3333, and a wire frame 3334. The magnetic guide member 3331 is arranged on the outside of the magnetic cylinder assembly 3332 and protects the magnetic cylinder assembly 3332. In some embodiments, the magnetic guide member 3331 can be a metal protective cover surrounding the magnetic cylinder assembly 3332. The magnetic cylinder assembly 3332 includes a magnet, a coil, and a guide pin, and uses the ampere rule to change the direction of N/S to acquire the driving force. The driving member 3333 includes an end 33331, a first shift rod 33332, and a second shift rod 33333 opposite to the end 33331. The end 33331 is connected with the magnetic cylinder assembly 3332, the first shift rod 33332 is connected with the first shield 3121, and the second shift rod 33333 is connected with the second shield 3122. The driving force generated by the magnetic cylinder assembly 3332 can drive the driving member 3333 (including the first shift rod 33332 and the second shift rod 33333) to rotate, thereby driving the first shield 3121 and the second shield 3122 to slide. Specifically, as shown in FIG. 11, the first shield 3121 also has a first installation slot 31214 matched with the first shift rod 33332, and the second shield 3122 also has a second installation slot 31224 matched with the second shift rod 33333. The first shift rod 33332 is inserted into the first installation slot 31214, and the second shift rod 33333 is inserted into the second installation slot 31224. When the first shift rod 33332 and the second shift rod 33333 rotate, the first shield 3121 and the second shield 3122 are driven to slide. Wireframe 3334 is configured to carry the coil.

The working principle of the camera equipment in the present disclosure is as follows: In the initial state (the camera equipment is not revealed or powered on), the shielding part blocks the through-hole, so that the camera is in a blocked state when the camera equipment is not in use. When the camera equipment is turned on, the camera equipment is powered on, and the controller controls the sensing chip to the output current. Changes in current cause the driver to move, thereby driving the shielding part to move to reveal the through-hole and expose the lens of the camera. When the user sends a control command (such as touching a touch key on the camera equipment) for the first time, the sensing spring senses the control command (such as identifying a capacitive key close to the user), and the capacitance on the sensing chip changes. The controller sends a first control signal (such as a sensing touch signal) according to the change of the capacitance and controls the sensing chip to not output current. The change in current causes the driver to move, thereby driving the shielding part to move to block the through-hole and block the lens of the camera. When the user sends a control command (such as touching the touch key on the camera equipment) for the second time, the sensing spring senses the control command for the second time, and the sensing spring senses the control command (such as identifying the capacitive key close to the user) for the second time. The capacitance on the sensing chip changes, and the controller sends a second control signal according to the change of the capacitance and controls the sensing chip to output current. The change in current causes the driver to move, thereby driving the shielding part to move to reveal the through-hole. The above operations are cycled. When the user no longer requires the camera equipment, the camera equipment is powered off, and the first shield and second shield are reset to close the through-hole.

Figure 12:
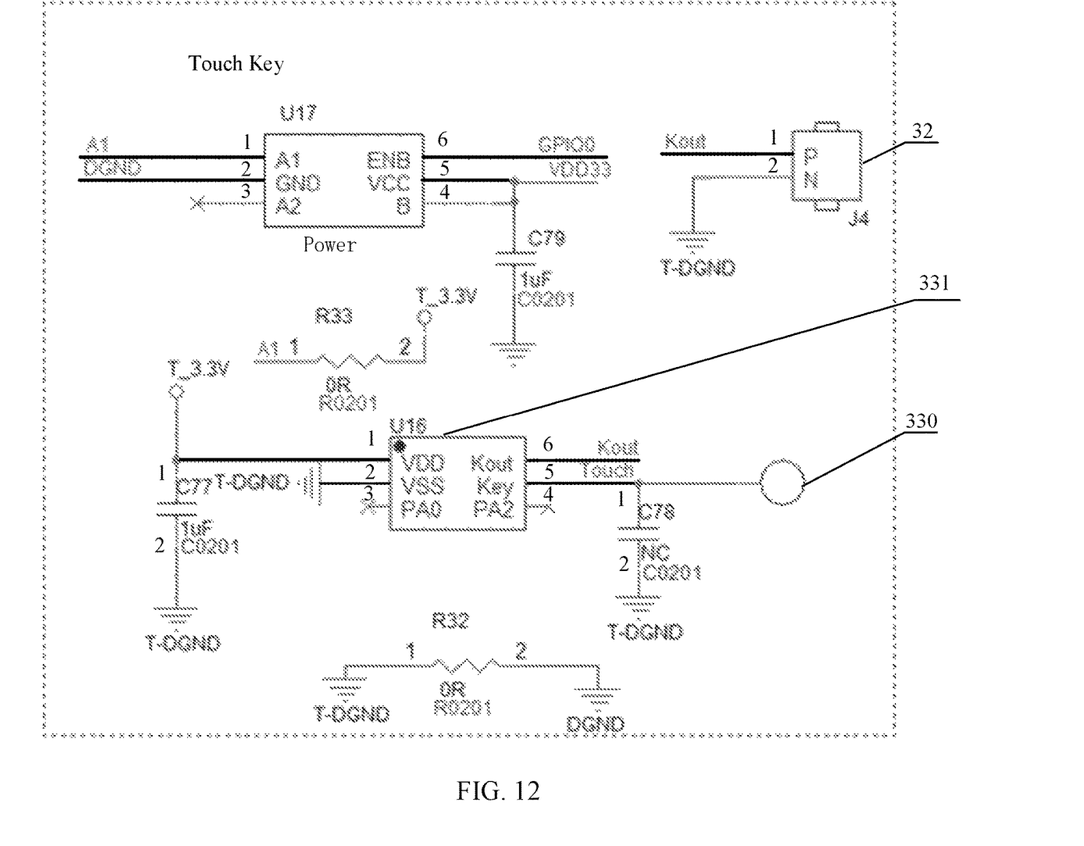
FIG. 12 is a circuit schematic view of a piece of camera equipment provided by the embodiments of the present disclosure.

FIG. 12 is a circuit schematic view of a piece of camera equipment provided by some embodiments of the present disclosure. Specifically, when the camera equipment is turned on, the camera equipment is powered on, and the controller begins to work. GPIO0 is pulled up, A1 is powered on by 3.3V, the sensing chip is powered on, and Kout outputs a voltage of 3.3V, so that the driver drives the shielding part to slide to reveal the through-hole. After the sensing touch signal is received for the first time, Kout outputs 0V voltage to make the driver drive the shielding part to slide to block the through-hole. After the sensing touch signal is received for the second time, Kout outputs 3.3V voltage to make the driver drive the shielding part to slide to reveal the through-hole. After the sensing touch signal is received for the third time, Kout outputs 0V voltage to make the driver drive the shielding part to slide to block the through-hole. With the above cycle, the purpose of revealing/closing the through-hole by touch control is achieved.

In the camera equipment provided by the present disclosure, the privacy cover assembly is arranged inside the housing. In this way, while not affecting the external appearance, an effective switch function control of the privacy cover assembly can be obtained by a more simple way of touching logic to realize the revealing and closing of the privacy cover assembly; that is, the closing of the video image can be realized independently, and the privacy of the user can be protected. In addition, the revealing and closing of the privacy cover assembly is realized by an electromagnetic drive, which has a constant voltage, can improve the stability of the system voltage, and will not affect the peripheral circuit.

As shown in FIG. 1, the camera equipment 1 may further include a mounting base 40 configured to support the housing 10, the camera assembly 20, and privacy cover assembly 30. Further, in some embodiments, the camera equipment may also include a microphone assembly (not shown) for exchanging audio data.

Figure 13:
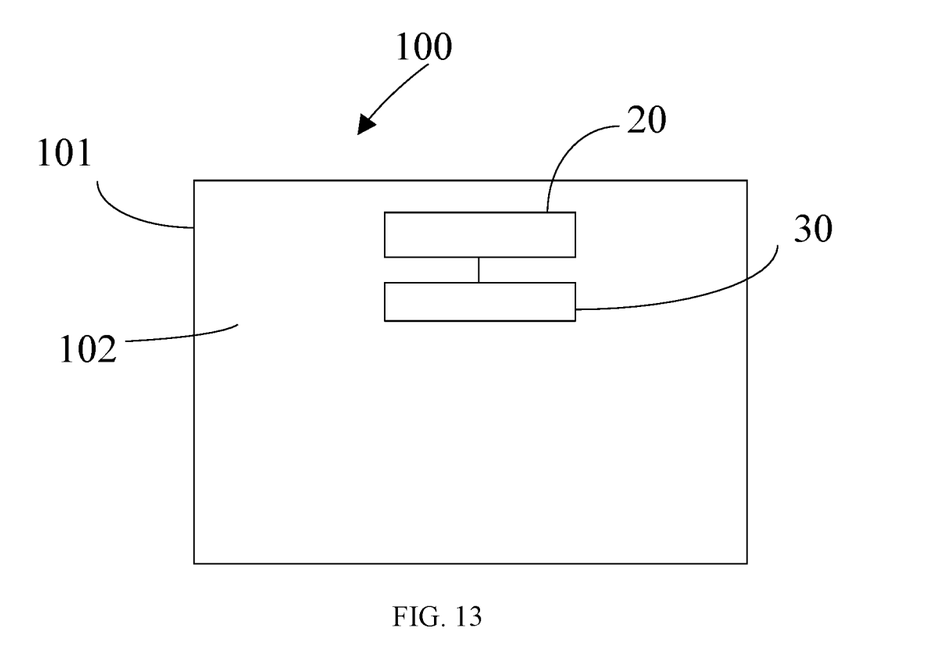
FIG. 13 is a structural schematic view of the terminal provided by some embodiments of the present disclosure.

As shown in FIG. 13, some embodiments of the present disclosure provide a terminal 100. The terminal includes a shell 101, a camera assembly 20, and a privacy cover module 30. The housing 100 defines a space 102. The camera assembly 20 and the privacy cover module 30 are arranged in the space 101. The camera assembly 20 includes a shutter component arranged in the space and a sensing mechanism. Specifically, the structures and settings of the camera assembly 20 and the privacy cover module 30 can be seen in the above embodiments, and will not be repeated here.

In the embodiments, the camera is integrated into the terminal; that is, the camera is a built-in component of the terminal.

The above-mentioned examples only express several embodiments of the present disclosure, and their descriptions are relatively specific and detailed, but they should not be construed as limiting the scope of the present disclosure. It should be noted that, for those of ordinary skill in the art, several modifications and improvements may be made without departing from the concept of the present disclosure, which are all within the scope of protection of the present disclosure. Therefore, the scope of protection of the present disclosure patent shall be subject to the appended claims.

The above only explains the embodiments of the present disclosure, and should not be construed as limiting the scope of the present disclosure. All equivalent structure or equivalent process transformations made by using the concept of the description and drawings of the present disclosure, or directly or indirectly applied in other related technical fields, are similarly included in the scope of protection of the present disclosure patent.

What is claimed is:

1. An external camera, comprising:
   a housing that defines an accommodation space;
   a camera assembly arranged in the accommodation space;
   a shutter component arranged in the accommodation space and defining a through-hole, wherein the through-hole is configured to enable the camera assembly to acquire image information through the through-hole; and
   a sensing mechanism connected with the shutter component and configured to control the shutter component to reveal or block the through-hole in response to the user's control command;
   wherein the shutter component comprises:
      a support part defining the through-hole; and
      a shielding part connected with the support part and the sensing mechanism and configured to reveal or block the through-hole under control of the sensing mechanism;
   wherein the sensing mechanism comprises a driver configured to drive the shielding part to slide or rotate to reveal or block the through-hole;
   wherein the support part comprises a first support and a second support, the first support and the second support enclosing to define a mounting space;
   wherein the first support is in a plate form, and the sending mechanism is arranged on a side of the first support away from the second support; the first support is arranged with a plurality of positioning columns, and the shielding part defines a plurality of sliding channels;
   the plurality of positioning columns are in a one-to-one correspondence with and slidable in the plurality of sliding channels.

2. The external camera as claimed in claim 1, wherein the shielding part comprises a plurality of shields, and the plurality of shields block the through-hole by splicing or overlapping.

3. The external camera as claimed in claim 1, wherein the shielding part comprises a first shield and a second shield, and the driver is configured to drive the first shield to slide to a first position along a direction close to the second shield and drive the second shield to slide to a second position along a direction close to the first shield so that the first shield and the second shield block the through-hole; and the driver is also configured to drive the first shield to slide to a third position along the direction away from the second shield and drive the second shield to slide to a fourth position along the direction away from the first shield so that the first shield and the second shield reveal the through-hole.

4. The external camera as claimed in claim 3, wherein the first shield and the second shield are configured to block the through-hole by overlapping when the first shield is in the first position and the second shield is in the second position, and the first shield and the second shield are also configured to reveal the through-hole by overlapping when the first shield is in the third position and the second shield is in the fourth position.

5. The external camera as claimed in claim 4, wherein the first shield comprises a first shield body and is provided with a penetrated hole, and the aperture size of the penetrated hole is greater than or equal to the aperture size of the through-hole; the second shield comprises a second shield body and is provided with a notch, the shape of the notch is part of the shape of the through-hole; and
   wherein the first shield and the second shield are configured such that when the first shield slides to the first position and the second shield slides to the second position, the notch and the penetrated hole are overlapped and coaxially arranged with the through-hole.

6. The external camera as claimed in claim 5, wherein the driver comprises a magnetic cylinder assembly and a driving member connected with the magnetic cylinder assembly, and the magnetic cylinder assembly is configured to provide the driving force for the driving member; the driving member comprises one end, and a first shift rod and a second shift rod arranged opposite to the end, the end is connected with the magnetic cylinder assembly, the first shift rod is connected with the first shield, and the second shift rod is connected with the second shield, and the driving member is configured to drive the first shield and the second shield to slide by using the driving force provided by the magnetic cylinder assembly.

7. The external camera as claimed in claim 3, wherein the plurality of sliding channels comprise a first sliding channel on the first shield and a second sliding channel on the second shield; the first sliding channel and the second sliding channel are configured to define a track on which the first shield and the second shield slide.

8. The external camera as claimed in claim 3, wherein the sensing mechanism comprises:
   a sensing switch configured to sense a control command;
   a sensing chip electrically connected with the sensing switch and the driver, and configured to output a current to the driver; and
   a controller electrically connected with the sensing chip and configured to control the sensing chip to output a current to the driver.

9. The external camera as claimed in claim 8, wherein the sensing switch is a sensing spring configured to identify the user's touch commands.

10. The external camera as claimed in claim 1, wherein,
    the housing comprises a mounting plate that defines a via-hole and is configured to enable the camera assembly to acquire external image data;
    the camera assembly comprises a camera and a camera holder configured to install the camera; and
    the shutter component is arranged between the camera, the mounting plate, and the via-hole, the through-hole, and the camera are coaxially arranged; the aperture of the through-hole and the aperture of the via-hole are both greater than or equal to the aperture of the camera lens.

11. The external camera according to claim 1, wherein
in response to the external camera being activated, the external camera is powered on, the shutter component reveals the through-hole, and the external camera is in a sensing state;
in the sensing state, in response to a first touch command being sensed, the shutter component blocks the through-hole; and in response to a second touch command being sensed, the shutter component reveals the through-hole; wherein the first touch command and the second touch command are of a same touch form; and
in the sensing state, in response to the user finishing in using the external camera, the shutter component blocks the through-hole.

* * * * *